US011745143B2

(12) United States Patent
Roderick et al.

(10) Patent No.: US 11,745,143 B2
(45) Date of Patent: Sep. 5, 2023

(54) MIXING-PROMOTING SPACER PATTERNS FOR SPIRAL-WOUND ELEMENTS

(71) Applicant: Aqua Membranes Inc., Albuquerque, NM (US)

(72) Inventors: Kevin Roderick, Albuquerque, NM (US); Rodney E Herrington, Albuquerque, NM (US)

(73) Assignee: Aqua Membranes, Inc., Albuquerque, NM (US)

( * ) Notice: Subject to any disclaimer, the term of this patent is extended or adjusted under 35 U.S.C. 154(b) by 149 days.

(21) Appl. No.: 16/606,752

(22) PCT Filed: Apr. 19, 2018

(86) PCT No.: PCT/US2018/028453
§ 371 (c)(1),
(2) Date: Oct. 19, 2019

(87) PCT Pub. No.: WO2018/195367
PCT Pub. Date: Oct. 25, 2018

(65) Prior Publication Data
US 2020/0188854 A1 Jun. 18, 2020

Related U.S. Application Data

(60) Provisional application No. 62/487,973, filed on Apr. 20, 2017.

(51) Int. Cl.
*B01D 63/10* (2006.01)
*B01D 65/08* (2006.01)
*B01D 61/02* (2006.01)

(52) U.S. Cl.
CPC ............ *B01D 63/10* (2013.01); *B01D 65/08* (2013.01); *B01D 61/025* (2013.01); *B01D 2313/08* (2013.01); *B01D 2313/143* (2013.01); *B01D 2313/146* (2013.01)

(58) Field of Classification Search
CPC ...... B01D 63/10; B01D 65/08; B01D 61/025; B01D 2313/08; B01D 2313/143; B01D 2313/146; B01D 2313/19
See application file for complete search history.

(56) References Cited

U.S. PATENT DOCUMENTS

| 3,963,621 A | 6/1976 | Newman |
| 4,187,173 A | 2/1980 | Keefer |
| 4,208,289 A | 6/1980 | Bray |
| 4,222,874 A | 9/1980 | Connelly |
| 4,228,014 A | 10/1980 | Timm et al. |
| 4,230,564 A | 10/1980 | Keefer |

(Continued)

FOREIGN PATENT DOCUMENTS

| CA | 2662925 A1 | 1/2009 |
| CA | 2825674 C | 8/2011 |

(Continued)

*Primary Examiner* — Waqaas Ali
(74) *Attorney, Agent, or Firm* — V Gerald Grafe

(57) ABSTRACT

Embodiments of the present invention provide for the deposition of spacing elements for spiral wound elements which promote mixing within the feed space during element operation thereby improving element performance and reducing concentration polarization and potential for biological fouling.

20 Claims, 2 Drawing Sheets

(56) References Cited

U.S. PATENT DOCUMENTS

| | | |
|---|---|---|
| 4,230,579 A | 10/1980 | Bray et al. |
| 4,235,723 A | 11/1980 | Bartlett, Jr. |
| 4,277,340 A | 7/1981 | Kanamaru et al. |
| 4,288,326 A | 9/1981 | Keefer |
| 4,309,287 A | 1/1982 | Roos et al. |
| 4,326,960 A | 4/1982 | Iwahori et al. |
| 4,341,631 A | 7/1982 | Hargitay |
| 4,347,132 A | 8/1982 | Davis |
| 4,354,939 A | 10/1982 | Pohl |
| 4,358,377 A | 11/1982 | Clark |
| 4,409,849 A | 10/1983 | Roos |
| 4,410,429 A | 10/1983 | Harvey et al. |
| 4,411,785 A | 10/1983 | Yu et al. |
| 4,426,285 A | 1/1984 | Davis |
| 4,434,056 A | 2/1984 | Keefer |
| 4,454,891 A | 6/1984 | Dreibelbis et al. |
| 4,461,707 A | 7/1984 | Thayer et al. |
| 4,476,022 A | 10/1984 | Doll |
| 4,482,459 A | 11/1984 | Shiver |
| 4,534,713 A | 8/1985 | Wanner |
| 4,556,488 A | 12/1985 | Timm et al. |
| 4,585,554 A | 4/1986 | Burrows |
| RE32,144 E | 5/1986 | Keefer |
| 4,595,497 A | 6/1986 | Burrows |
| 4,599,171 A | 7/1986 | Padilla et al. |
| 4,600,512 A | 7/1986 | Aid |
| 4,608,140 A | 8/1986 | Goldstein |
| 4,613,436 A | 9/1986 | Wight et al. |
| 4,623,451 A | 11/1986 | Oliver |
| 4,623,467 A | 11/1986 | Hamlin |
| 4,640,774 A | 2/1987 | Garcera et al. |
| 4,645,601 A | 2/1987 | Regunathan et al. |
| 4,652,373 A | 3/1987 | Trimmer |
| 4,657,674 A | 4/1987 | Burrows |
| 4,670,144 A | 6/1987 | McCausland et al. |
| 4,695,375 A | 9/1987 | Tyler |
| 4,704,324 A | 11/1987 | Davis et al. |
| 4,705,625 A | 11/1987 | Hart, Jr. |
| 4,735,716 A | 4/1988 | Petrucci et al. |
| 4,735,718 A | 4/1988 | Peters |
| 4,741,823 A | 5/1988 | Olsen et al. |
| 4,743,366 A | 5/1988 | Burrows |
| 4,744,895 A | 5/1988 | Gales et al. |
| 4,744,900 A | 5/1988 | Bratt |
| 4,756,835 A | 7/1988 | Wilson |
| 4,775,465 A | 10/1988 | Burrows |
| 4,781,831 A | 11/1988 | Goldsmith |
| 4,784,771 A | 11/1988 | Wathen et al. |
| 4,802,982 A | 2/1989 | Lien |
| 4,814,079 A | 3/1989 | Schneider |
| 4,820,413 A | 4/1989 | Lopez |
| 4,830,744 A | 5/1989 | Burrows |
| 4,832,850 A | 5/1989 | Cais et al. |
| 4,834,873 A | 5/1989 | Burrows |
| 4,842,725 A | 6/1989 | Blad et al. |
| 4,842,736 A | 6/1989 | Bray |
| 4,844,805 A | 7/1989 | Solomon |
| 4,855,058 A | 8/1989 | Holland et al. |
| 4,856,559 A | 8/1989 | Lipshultz et al. |
| 4,869,821 A | 9/1989 | Korin |
| 4,874,514 A | 10/1989 | Casey, Jr. |
| 4,876,002 A | 10/1989 | Marshall et al. |
| 4,877,521 A | 10/1989 | Petrucci et al. |
| 4,882,061 A | 11/1989 | Petrucci et al. |
| 4,882,223 A | 11/1989 | Aptel et al. |
| RE33,135 E | 12/1989 | Wanner, Sr. et al. |
| 4,885,092 A | 12/1989 | Zwick |
| 4,886,597 A | 12/1989 | Wild et al. |
| 4,892,657 A | 1/1990 | Mohn et al. |
| 4,902,417 A | 2/1990 | Lien |
| 4,906,372 A | 3/1990 | Hopkins |
| 4,917,847 A | 4/1990 | Solomon |
| 4,937,557 A | 6/1990 | Tucci et al. |
| 4,944,877 A | 7/1990 | Maples |
| 4,988,525 A | 1/1991 | Gresch |
| 4,990,248 A | 2/1991 | Brown et al. |
| 4,992,170 A | 2/1991 | Menon et al. |
| 4,995,977 A | 2/1991 | Hilgendorff et al. |
| 5,002,664 A | 3/1991 | Clack et al. |
| 5,017,284 A | 5/1991 | Miler et al. |
| 5,043,066 A | 8/1991 | Miller et al. |
| 5,045,197 A | 9/1991 | Burrows |
| 5,057,212 A | 10/1991 | Burrows |
| 5,069,789 A | 12/1991 | Mohn et al. |
| 5,078,876 A | 1/1992 | Whittier et al. |
| 5,094,749 A | 3/1992 | Seita et al. |
| 5,096,574 A | 3/1992 | Birdsong et al. |
| 5,104,532 A | 4/1992 | Thompson et al. |
| 5,108,604 A | 4/1992 | Robbins |
| 5,128,035 A | 7/1992 | Clack et al. |
| 5,131,277 A | 7/1992 | Birdsong et al. |
| 5,132,017 A | 7/1992 | Birdsong et al. |
| 5,145,575 A | 9/1992 | Burrows |
| 5,167,786 A | 12/1992 | Eberle |
| 5,167,826 A | 12/1992 | Eaton |
| 5,183,567 A | 2/1993 | Mohn et al. |
| 5,194,156 A | 3/1993 | Tomchak |
| 5,198,110 A | 3/1993 | Hanai et al. |
| 5,204,002 A | 4/1993 | Belfort et al. |
| 5,232,591 A | 8/1993 | Solomon |
| 5,234,583 A | 8/1993 | Cluff |
| 5,240,612 A | 8/1993 | Grangeon et al. |
| 5,279,732 A | 1/1994 | Edens |
| 5,296,148 A | 3/1994 | Colangelo et al. |
| 5,354,464 A | 10/1994 | Slovak et al. |
| 5,362,383 A | 11/1994 | Zimmerman et al. |
| 5,462,414 A | 10/1995 | Permar |
| 5,466,366 A | 11/1995 | Chia-ching |
| 5,468,387 A | 11/1995 | Solomon |
| 5,507,943 A | 4/1996 | Labrador |
| RE35,252 E | 5/1996 | Clack et al. |
| 5,545,320 A | 8/1996 | Heine et al. |
| 5,573,662 A | 11/1996 | Abe et al. |
| 5,597,487 A | 1/1997 | Vogel et al. |
| 5,626,752 A | 5/1997 | Mohn et al. |
| 5,626,758 A | 5/1997 | Belfort |
| 5,628,198 A | 5/1997 | Permar |
| 5,681,459 A | 10/1997 | Bowman |
| 5,681,467 A | 10/1997 | Solie et al. |
| 5,788,858 A | 8/1998 | Acernese et al. |
| 5,795,475 A | 8/1998 | Luedke et al. |
| 5,811,251 A | 9/1998 | Hirose et al. |
| 5,824,217 A | 10/1998 | Pearl et al. |
| 5,914,041 A | 6/1999 | Chancellor |
| 5,944,985 A | 8/1999 | Bowman |
| 5,985,146 A | 11/1999 | Knappe et al. |
| 6,030,535 A | 2/2000 | Hayashi et al. |
| 6,071,404 A | 6/2000 | Tsui |
| 6,071,414 A | 6/2000 | Kishi |
| 6,099,735 A | 8/2000 | Kelada |
| 6,109,029 A | 8/2000 | Vowles et al. |
| 6,110,360 A | 8/2000 | Hart, Jr. |
| 6,117,297 A | 9/2000 | Goldstein |
| 6,120,682 A | 9/2000 | Cook |
| 6,126,833 A | 10/2000 | Stobbe et al. |
| 6,174,437 B1 | 1/2001 | Haney |
| 6,190,557 B1 | 2/2001 | Hisada et al. |
| 6,193,879 B1 | 2/2001 | Bowman |
| 6,197,191 B1 | 3/2001 | Wobben |
| 6,217,773 B1 | 4/2001 | Graham |
| 6,258,270 B1 | 7/2001 | Hilgendorff et al. |
| 6,277,282 B1 | 8/2001 | Kihara et al. |
| 6,299,766 B1 | 10/2001 | Permar |
| 6,345,961 B1 | 2/2002 | Oklejas, Jr. |
| 6,348,148 B1 | 2/2002 | Bosley |
| 6,379,518 B1 | 4/2002 | Osawa et al. |
| 6,379,548 B1 | 4/2002 | Kurokawa et al. |
| 6,383,384 B1 | 5/2002 | Anderson |
| RE37,759 E | 6/2002 | Belfort |
| RE77,591 | 6/2002 | Belfort |
| 6,402,956 B1 | 6/2002 | Andou et al. |
| 6,423,212 B1 | 7/2002 | Bosko |
| 6,423,223 B1 | 7/2002 | Northcut et al. |
| 6,432,301 B1 | 8/2002 | Dengler |

(56) References Cited

U.S. PATENT DOCUMENTS

| | | |
|---|---|---|
| 6,436,282 B1 | 8/2002 | Gundrum et al. |
| 6,447,259 B2 | 9/2002 | Elliott-Moore |
| 6,514,398 B2 | 2/2003 | DiMascio et al. |
| 6,521,124 B2 | 2/2003 | Northcut et al. |
| 6,521,127 B1 | 2/2003 | Chancellor |
| 6,524,478 B1 | 2/2003 | Heine et al. |
| 6,540,915 B2 | 4/2003 | Patil |
| 6,575,308 B1 | 6/2003 | Fuls et al. |
| 6,579,451 B1 | 6/2003 | Avero |
| 6,607,668 B2 | 8/2003 | Rela |
| 6,613,231 B1 | 9/2003 | Jitariouk |
| 6,632,357 B1 | 10/2003 | Barger et al. |
| 6,790,345 B2 | 9/2004 | Broussard |
| 6,805,796 B2 | 10/2004 | Hirose et al. |
| 6,830,683 B2 | 12/2004 | Gundrum et al. |
| 6,866,831 B2 | 3/2005 | Nakao et al. |
| 6,929,743 B2 | 8/2005 | Diel |
| 6,929,748 B2 | 8/2005 | Avijit et al. |
| 7,021,667 B2 | 4/2006 | Campbell et al. |
| 7,186,331 B2 | 3/2007 | Maartens et al. |
| 7,244,357 B2 | 7/2007 | Herrington et al. |
| 7,297,268 B2 | 11/2007 | Herrington et al. |
| 7,306,437 B2 | 12/2007 | Hauge |
| 7,311,831 B2 | 12/2007 | Bradford et al. |
| 7,351,335 B2 | 4/2008 | Broens et al. |
| 7,387,725 B2 | 6/2008 | Choi et al. |
| 7,416,666 B2 | 8/2008 | Gordon |
| 7,449,093 B2 | 11/2008 | Dudziak et al. |
| 7,455,778 B2 | 11/2008 | Gordon |
| 7,501,064 B2 | 3/2009 | Schmidt et al. |
| 7,514,010 B2 | 4/2009 | Salmon |
| 7,520,981 B2 | 4/2009 | Barber |
| 7,540,956 B1 | 6/2009 | Kurth et al. |
| 7,650,805 B2 | 1/2010 | Nauseda et al. |
| 7,733,459 B2 | 6/2010 | Dierichs et al. |
| 7,736,503 B2 | 6/2010 | Kennedy et al. |
| 7,862,723 B2 | 1/2011 | Cartwright |
| 7,875,184 B2 | 1/2011 | Parker et al. |
| 7,892,429 B2 | 2/2011 | Oklejas, Jr. |
| 7,901,580 B2 | 3/2011 | Salyer |
| 7,909,998 B2 | 3/2011 | Kennedy et al. |
| 7,910,004 B2 | 3/2011 | Cohen et al. |
| 7,927,082 B2 | 4/2011 | Haudenschild |
| 7,981,293 B2 | 7/2011 | Powell |
| 8,021,550 B2 | 9/2011 | Beauchamp et al. |
| 8,101,074 B2 | 1/2012 | Larsen |
| 8,114,286 B2 | 2/2012 | Kawakami |
| 8,147,699 B2 | 4/2012 | Goldsmith |
| 8,257,594 B2 | 9/2012 | Astle et al. |
| 8,282,823 B2 | 10/2012 | Acernese et al. |
| 8,292,088 B2 | 10/2012 | Francisco et al. |
| 8,292,492 B2 | 10/2012 | Ho et al. |
| 8,414,767 B2 | 4/2013 | Gaignet et al. |
| 8,425,734 B2 | 4/2013 | Goel et al. |
| 8,454,829 B2 | 6/2013 | Yaeger |
| 8,506,685 B2 | 8/2013 | Taylor et al. |
| 8,518,225 B2 | 8/2013 | Sumita et al. |
| 8,628,642 B2 | 1/2014 | Goel et al. |
| 8,652,326 B2 | 2/2014 | Johann et al. |
| 8,685,252 B2 | 4/2014 | Vuong et al. |
| 8,696,904 B2 | 4/2014 | Thiyagarajan et al. |
| 8,771,510 B2 | 7/2014 | Takahashi et al. |
| 8,778,055 B2 | 7/2014 | Taylor et al. |
| 8,808,538 B2 | 8/2014 | Oklejas, Jr. |
| 8,889,009 B2 | 11/2014 | Brausch et al. |
| 8,944,257 B2 | 2/2015 | Eisen et al. |
| 8,961,790 B2 | 2/2015 | Beauchamp et al. |
| 8,968,566 B2 | 3/2015 | Beauchamp et al. |
| 8,999,162 B2 | 4/2015 | Vuong et al. |
| 9,011,664 B2 | 4/2015 | Takahashi et al. |
| 9,011,688 B2 | 4/2015 | Takahashi et al. |
| 9,108,162 B2 | 8/2015 | Takahashi et al. |
| 9,114,365 B2 | 8/2015 | Schmitt |
| 9,260,325 B2 | 2/2016 | Takahashi et al. |
| 9,328,743 B2 | 5/2016 | Hirosawa et al. |
| 9,387,445 B2 | 7/2016 | Kimura et al. |
| 9,403,125 B2 | 8/2016 | Shaffer |
| 9,475,008 B2 | 10/2016 | Salama et al. |
| 9,492,792 B2 | 11/2016 | Tomescu et al. |
| 9,546,671 B2 | 1/2017 | Hirosawa et al. |
| 9,597,640 B2 | 3/2017 | Koiwa et al. |
| 9,616,390 B2 | 4/2017 | Hirozawa et al. |
| 9,617,172 B1 | 4/2017 | Baski |
| 9,724,646 B2 | 8/2017 | Okamoto et al. |
| 9,731,984 B2 | 8/2017 | Beall |
| 9,758,389 B2 | 9/2017 | Rau, III |
| 9,764,291 B2 | 9/2017 | Hirozawa et al. |
| 9,808,767 B2 | 11/2017 | Tabayashi et al. |
| 2008/0290031 A1 | 11/2008 | Popa |
| 2012/0018366 A1* | 1/2012 | Buser ............... B01D 69/02 210/321.64 |
| 2012/0298578 A1* | 11/2012 | Herrington ........ B01D 61/025 210/500.1 |
| 2013/0334128 A1 | 12/2013 | Takagi et al. |
| 2015/0068971 A1 | 3/2015 | Koiwa et al. |
| 2015/0298064 A1 | 10/2015 | Takagi et al. |
| 2015/0343388 A1 | 12/2015 | Hester et al. |
| 2016/0008763 A1 | 1/2016 | Roderick et al. |
| 2016/0236132 A1 | 8/2016 | Hara et al. |

FOREIGN PATENT DOCUMENTS

| | | | |
|---|---|---|---|
| EP | 2902094 | | 8/2015 |
| KR | 20110002036 A * | 1/2011 | ............ B01D 69/04 |
| KR | 20110002036 A * | 1/2011 | |
| WO | WO2010047360 A1 | 4/2010 | |
| WO | WO-2011094236 A2 * | 8/2011 | ........... B01D 61/022 |
| WO | WO2015016253 A1 | 2/2015 | |
| WO | WO2002/055179 | 8/2015 | |
| WO | WO2016199272 A1 | 12/2016 | |
| WO | WO2017087461 A1 | 5/2017 | |

* cited by examiner

MIXING-PROMOTING SPACER PATTERNS FOR SPIRAL-WOUND ELEMENTS

CROSS-REFERENCE TO RELATED APPLICATIONS

This application is a national stage application under 35 U.S.C. 371 of PCT application PCT/US2018/028453, filed 19 Apr. 2018, which claims priority to U.S. provisional application 62/487,973, filed 20 Apr. 2017. Each of the foregoing is incorporated by reference herein.

TECHNICAL FIELD

The subject invention relates to a permeable membrane system utilized for the separation of fluid components, specifically spiral-wound permeable membrane elements.

BACKGROUND ART

Spiral-wound membrane filtration elements well known in the art comprise a laminated structure including a membrane sheet sealed to or around a porous permeate spacer which creates a path for removal of the fluid passing through the membrane to a central tube. This laminated structure is wrapped spirally around the central tube and spaced from itself with a porous feed spacer to allow axial flow of the fluid through the element. The porous feed spacer is placed between the folded layers of membrane sheet to form a leaf, and one or several of these leaves are stacked in between layers of permeate spacer and rolled to create the element. While this feed spacer is necessary to maintain open and uniform axial flow between the laminated structure, it is also a source of flow restriction and pressure drop within the axial flow channel and also presents areas of restriction of flow and contact to the membrane that contribute significantly to membrane fouling via biological growth, scale formation, and particle capture.

Improvements to the design of spiral wound elements have been disclosed by Barger et al. and Bradford et al., which replace the feed spacer with islands or protrusions either deposited or embossed directly onto the outside or active surface of the membrane. This configuration is advantageous in that it maintains spacing for axial flow through the element while minimizing obstruction within the flow channel. It also eliminates the porous feed spacer as a separate component, thus simplifying element manufacture. Patent publication number US2016-0008763-A1 entitled Improved Spiral Wound Element Construction teaches the application of printed patterns on the back side of the active surface of the membrane sheet, or directly on the surface of the permeate spacer.

The following references, each of which is incorporated herein by reference, can facilitate understanding of the invention: U.S. Pat. Nos. 3,962,096; 4,476,022; 4,756,835; 4,834,881; 4,855,058; 4,902,417; 4,861,487; 6,632,357; and US application 2016-0008763-A1.

DISCLOSURE OF INVENTION

Embodiments of the present invention provide a membrane for use in a spiral wound permeable membrane system, comprising a membrane having spacing features disposed on a surface of the membrane, wherein the spacing features are configured such that the features direct fluid flow along one or more tortuous paths.

In some embodiments, the spacing features comprise a plurality of substantially parallel line segments disposed in an array wherein the line segments are oriented at an angle other than zero degrees to the direction of fluid flow in the permeable membrane system, the line segments are separated from each other by a first distance along a dimension perpendicular to the overall direction of fluid flow and by a second distance along a dimension parallel to the overall direction of fluid flow, and wherein the line segments are disposed to prevent fluid flow direct from inlet to outlet of the system. In some embodiments, the line segments are 0.01" to 0.03" wide, 0.1" to 0.3" long, the first distance is 0.4" to 0.7", and the second distance is 0.4" to 0.7". In some embodiments, the line segments are 0.02" wide, 0.1875" long, the first distance is 0.5625", and the second distance is 0.5625".

In some embodiments, the spacing features comprise a plurality of chevron shaped features, disposed in a two-dimensional array on the membrane, with each line of the array offset from adjacent lines such that fluid flowing between two chevrons in one line is turned by a chevron in a successive line. In some embodiments, each feature is 0.01" to 0.03" in thickness, 0.08" to 0.2" in width, 0.1" to 0.3" in height, disposed with a gap of 0.4" to 0.7" between adjacent features in each line and line spaced 0.4" to 0.7" apart. In some embodiments, each feature is 0.02" in thickness, 0.0938" in width, 0.1875" in height, disposed with a gap of 0.5625" between adjacent features in each line and line spaced 0.5625" apart.

In some embodiments, the spacing features comprise a plurality of line segments, wherein a first subset of the line segments are oriented at a first angle to the direction from inlet to outlet, and wherein a second subset of the line segments are oriented at a second angle to the direction from inlet to outlet, and wherein the line segments are positioned such that fluid flow in a direction along a line segment in the first subset is redirected by a line segment in the second subset. In some embodiments, the features are 0.01" to 0.03" in thickness, with equal length and height of 0.1" to 0.3". In some embodiments, the first angle is 35° to 55° and the second angle is 125° to 145°. In some embodiments, the first angle is 45° and the second angle is 135°. In some embodiments, the features are separated by 0.4" to 0.7". In some embodiments, the features are separated by 0.5625". In some embodiments, the first angle is 12.5° to 32.5° and the second angle is 147.5° to 167.5°. In some embodiments, the first angle is 22.5° and the second angle is 157.5°. In some embodiments, the features are separated by 0.19" to 0.39".

In some embodiments, the spacing features comprise a first plurality of spacing features extend a first height above the surface of the membrane, and a second plurality of spacing features extend a second height above the surface of the membrane, wherein the second height is less than the first height. In some embodiments, the second height is no more than one half the first height.

In some embodiments, the spacing features are no more than 0.01" in height.

Some embodiments provide a membrane for use in a spiral wound permeable membrane system, comprising a membrane having spacing features disposed on a surface of the membrane, wherein the spacing features are no more than 0.01" in height.

In some embodiments, the spacing features are made of one or more of thermoplastics, reactive polymers, waxes, or resins; deposited directly onto the membrane surface.

In some embodiments, the spacing features are made of one or more of high-temperature thermoplastics, metals, or ceramics; formed apart from the membrane surface and then adhered to the membrane surface.

Embodiments of the present invention provide a permeable membrane system comprising a membrane as described herein.

Embodiments of the present invention provide a water treatment facility comprising one or more permeable membrane systems as described herein.

Embodiments of the present invention provide a method of treating water, comprising providing a permeable membrane system as described herein, and passing water to be treated through the permeable membrane system.

Embodiments of the present invention provide a method of making a permeable membrane system, comprising providing a membrane as described herein, and spirally winding the membrane.

MODES FOR CARRYING OUT THE INVENTION AND INDUSTRIAL APPLICABILITY

Embossing or depositing features onto the surface of the membrane sheet, or onto or into the permeate carrier sheet of a spiral-wound element to provide spacing between adjacent membrane sheets can provide several advantages as compared to feed spacer mesh, including more open flow channels, lower pressure drop, reduced fouling, and the ability to produce thinner feed space than would be practical using a mesh. Thinner feed spacers produce higher fluid shear between the active surfaces of the membrane sheet and can promote higher flux through a unit area of the membrane sheets. The membrane sheet itself can be made with a non-woven porous layer of polypropylene, bonded to a porous layer of polysulfone, with the membrane polymer material cast onto the polysulfone layer. Various other materials and methods can be used to make the membrane sheet. Membrane sheet can be made that provides varying degrees of removal efficiency. Micro filtration membranes can typically remove material as small as about 0.1 micron, typical of bacteria and protozoa, or other contaminants of such size in industrial applications. Ultra filtration membranes can have pore sizes as small as about 0.01 micron and can remove, as an example, viruses from fluid sources. Nano filtration membranes can have pore sizes small enough to remove di-valent ions, but will pass monovalent ions such as sodium and chloride. An example of application of nano filtration is water softening to remove, as an example, calcium carbonate. Reverse osmosis is typically the smallest pore size, and is sufficient to remove mono-valent salts, typically used in desalination applications. Various configurations of these spacer features have been disclosed by Barger et al. and Bradford et al. PCT/US14/18813, incorporated herein by reference, discloses various methods and materials suitable for depositing spacing features on membrane sheets. Those methods and materials can be useful in implementing embodiments of the present invention.

The present invention provides various patterns and configurations of embossed or deposited features that enhance mixing of the fluid in the feed/reject channel. During fluid separation within a spiral-wound element, ions, compounds, or solids can become concentrated at the reject or outlet end of the flow channel and at the membrane surface where separation occurs. Enhanced mixing and in some cases shortened diffusion paths for the fluid can be advantageous because it can counter this concentration of substances at the membrane surface as well as prevent stagnation points where biological fouling can occur. Mixing can also reduce the likelihood of precipitation of solids into scale by reducing the localized concentration of dissolved solids.

Figure 1:
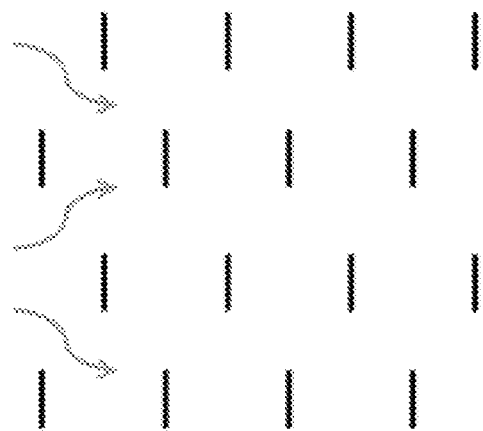
FIG. 1 is a schematic illustration of an example embodiment comprising an array of mixing promoting features oriented perpendicular to the direction of fluid flow in a spiral-wound element.

Referring to FIG. 1, in an example embodiment of the present invention, an array of line segment features is embossed or deposited on one half of the membrane leaf, with each segment feature oriented in a direction perpendicular to flow, with regular open spaces between the segment features. These segment features define the feed space and flow paths for liquid through the spiral-wound element. Adjacent rows of these features are staggered such that the open spaces on one row are at least partly aligned with the line segments of the adjacent row forcing a tortuous path (repeated twists, turns, or bends) for liquid flow between the features. As an example, suitable features for some spiral wound element applications can be 0.01" to 0.03" wide, e.g. 0.020" wide, and 0.1" to 0.3" long, e.g. 0.1875" long, with a gap of 0.4" to 0.7", e.g. 0.5625", between adjacent features in each row and rows spaced 0.4" to 0.7", e.g. 0.5625", apart. This pattern will provide a higher pressure drop but also higher levels of mixing than other example embodiments described herein, such as those where the features are angled with respect to the direction of fluid flow. Alternative dimensional relationships, such as smaller or larger gap sizes, feature length, or row spacing can also be utilized in order to best optimize mixing and pressure drop within the element for various applications.

Figure 2:
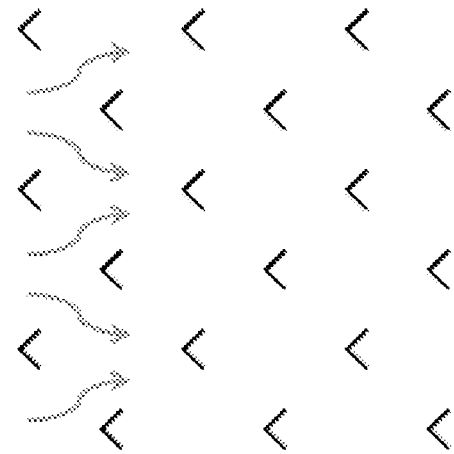
FIG. 2 is a schematic illustration of an example embodiment comprising an array of chevron shaped mixing promoting features oriented with their point directed in the opposite direction of fluid flow in a spiral-wound element.

In another example embodiment of the present invention shown in FIG. 2, an array of chevron or parabolic curved features is embossed or deposited on one half of the membrane leaf such that their pointed ends are directed in opposite direction as fluid flow, e.g. pointing towards the inlet of the spiral-wound element. These features define the feed space and flow paths for liquid through the spiral-wound element. Adjacent rows of these features are staggered such that the open spaces on one row are at least partly aligned with the features of the adjacent row forcing a tortuous path for liquid flow between the features. As an example, suitable features for some spiral wound element applications can be 0.01" to 0.03" in thickness, e.g. 0.020" in thickness, with equal width of 0.08" to 0.2", e.g. 0.0938", and height of 0.1" to 0.3", e.g. 0.1875", with a gap of 0.4" to 0.7", e.g. 0.5625", between adjacent features in each row and rows spaced 0.4" to 0.7", e.g. 0.5625", apart. This pattern can provide lower pressure drop with high levels of mixing relative to other example embodiments, but can foster stagnation zones behind the features. Replacing the chevrons with diamonds can create similar flow paths while reducing the potential for stagnant zones. Alternative dimensional relationships, such as smaller or larger gap sizes, feature length, different length legs on each side of the chevron, or row spacing can also be utilized in order to best optimize mixing and pressure drop within the element for various applications.

Figure 3A:
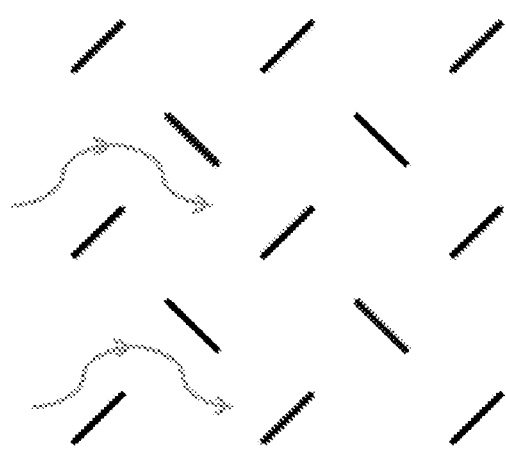
FIG. 3A is a schematic illustration of an example embodiment comprising two arrays of mixing promoting features oriented at opposing angles with respect to the direction of fluid flow in a spiral-wound element.
Figure 3B:
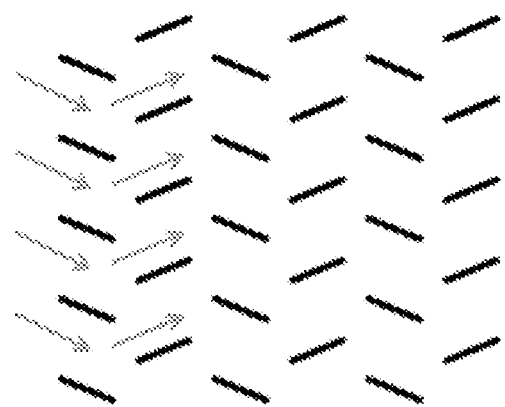
FIG. 3B is a schematic illustration of an example embodiment comprising two arrays of mixing promoting features oriented at opposing shallow angles with respect to the direction of fluid flow in a spiral-wound element.

A further example embodiment of the present invention comprises an array of angled line segments embossed or deposited on one half of the membrane leaf arranged in a cross-hatched pattern of alternating rows of alternating angles. These features define the feed space and flow paths for liquid through the spiral-wound element. Adjacent rows of these features are staggered such that the open spaces on one row are at least partly aligned with the features of the adjacent row forcing a tortuous path for liquid flow between the features. FIG. 3A shows features that are 0.01" to 0.03" in thickness, e.g. 0.020" in thickness, with equal length and height of 0.1" to 0.3", e.g. 0.1875", creating angles of 35° to 55°, e.g. 45°, and 125° to 145°, e.g. 135°, respectively for adjacent rows with respect to the direction of fluid flow, suitable for some spiral wound element applications. The gap between adjacent features in each row is 0.4" to 0.7", e.g. 0.5625", and rows are spaced 0.4" to 0.7", e.g. 0.5625", apart. These features promote turbulence and mixing while minimizing both pressure drop and potential stagnation points which can cause biological fouling. Alternatively, the features can be placed at shallow angles with respect to the direction of fluid flow and closer spacing in order to reduce pressure drop as shown in FIG. 3B, for example at angles of 12.5° to 32.5°, e.g. 22.5°, and 147.5° to 167.5°, e.g. 157.5°, with spacing within each row of 0.19" to 0.39", e.g. 0.29", between features. Alternative dimensional relationships, such as smaller or larger gap sizes, feature length, or row spacing, as well as other angles can also be utilized in order to best optimize mixing and pressure drop within the element for various applications.

Figure 4A:
FIG. 4A is a schematic illustration of a profile view of an example embodiment where a first array of mixing promoting features is the full height of the fluid flow channel while a second array of mixing promoting features is one-half the height of the first array and deposited on a single side of the membrane leaf.
Figure 4B:
FIG. 4B is a schematic illustration of a profile view of an example embodiment where a first array of mixing promoting features is the full height of the fluid flow channel while a second array of mixing promoting features is one-half the height of the first array and deposited on the full length of the membrane leaf.

Another example embodiment employs printed or deposited spacers in arrays of different heights within a given membrane leaf as shown in FIG. 4A and FIG. 4B. In some example applications, one array of features is 0.010"-0.025" in height, e.g. 0.015" in height, and the second array of features is half the height of the first array, e.g. e.g. 0.0075" in height. The first array of features is used to support the feed space between the folded leaf of the spiral-wound element, while the second array is in place to promote mixing within the feed space. The arrays can be symmetrical in that for each full height feature in the first array there is a corresponding feature in the second array evenly spaced within the first array, or the second array can have more elements than the first array. Having a second array of half-height features encourages mixing while reducing pressure drop within the element when compared to a corresponding array of full-height features. The first and second array can be of the same design and orientation, or they can have differing designs and differing orientations. The array designs can include any of the previously listed embodiments, and additionally can include simpler shapes including round or polygonal posts or islands. Spacing of the first array can be larger than the arrays previously described, with spacing of the array of 0.5" to 1" in each dimension in some example embodiments. The secondary array can also be embossed or deposited over the full length of the membrane leaf such that when the leaf is folded, one-half of the array is on the side of the array with the first array and the other half is on the surface opposite that of the first array so that the half-height features protrude from both the top and the bottom of the flow channel in order to promote more even mixing.

Figure 5:
FIG. 5 is a profile view of an embodiment where an array of mixing promoting features is of a minimal height in order to promote high flow velocity, shear, and mixing.

In an example embodiment a very thin array of feed spacing features as in FIG. 5, less than or equal to 0.010" in height, is employed to promote high velocity and high shear within the feed channel, as well as reducing diffusion distances to reduce concentration polarization. By reducing concentration polarization, or the accumulation of ions at the membrane surface, the pressure required to push molecules through the membrane surface is reduced. This creates greater flux per square foot of membrane surface (more fluid flow per square foot), resulting in less energy or higher production for a given size membrane element. This flux increase creates more fluid flow which is in addition to more surface area in the membrane element by virtue of thinner feed spaces that allow for more membrane sheet to be rolled into the same size membrane element. The array designs can include any of the previously listed embodiments, and additionally can include simpler shapes such as round or polygonal posts or islands. While this arrangement will increase pressure drop within the channel, the advantages of increased mixing and reduced diffusion distances can outweigh the restriction to flow in some applications.

Changing the feature pattern and spacing to increase pressure drop will also increase mixing which is advantageous in applications where higher shear and mixing can reduce concentration polarization near the membrane surface, such as applications where the solution being filtered is high in total dissolved solids (TDS). For applications with low TDS, it can be more preferable to have more open channels, less mixing, and reduced pressure drop to improve energy efficiency.

The features can comprise any number of materials that are compatible with the separated fluid and the permeate carrier including, but not limited to, thermoplastics, reactive polymers, waxes, or resins. Additionally, materials that are compatible with the separated fluid but not compatible with direct deposition to the permeate carrier, including, but not limited to high-temperature thermoplastics, metals, or ceramics, may be pre-formed, cast, or cut to the proper dimensions and adhered to the surface of the permeate carrier with an adhesive that is compatible with the permeate carrier.

The present invention has been described in connection with various example embodiments. It will be understood that the above description is merely illustrative of the applications of the principles of the present invention, the scope of which is to be determined by the claims viewed in light of the specification. Other variants and modifications of the invention will be apparent to those skilled in the art.

We claim:

1. A membrane for use in a spiral wound permeable membrane system, comprising a membrane having spacing features deposited directly onto a surface of the membrane, wherein the spacing features are configured such that the features direct fluid flow along one or more tortuous paths, wherein the spacing features comprise a first plurality of spacing features that extend a first height above the surface of the membrane, and a second plurality of spacing features that extend a second height above the surface of the membrane, wherein the second height is less than the first height.

2. A membrane as in claim 1, wherein the spacing features comprise a plurality of substantially parallel line segments disposed in an array wherein the line segments are oriented at an angle other than zero degrees to the direction of fluid flow in the permeable membrane system, the line segments are separated from each other by a first distance along a dimension perpendicular to the overall direction of fluid flow and by a second distance along a dimension parallel to the overall direction of fluid flow, and wherein the line segments are disposed to prevent fluid flow direct from inlet to outlet of the system.

3. A membrane as in claim 2, wherein the line segments are 0.01" to 0.03" wide, 0.1" to 0.3" long, the first distance is 0.4" to 0.7", and the second distance is 0.4" to 0.7".

4. A membrane as in claim 3, wherein the line segments are 0.02" wide, 0.1875" long, the first distance is 0.5625", and the second distance is 0.5625".

5. A membrane as in claim 1, wherein the spacing features comprise a plurality of chevron shaped features, disposed in a two-dimensional array on the membrane, with each line of the array offset from adjacent lines such that fluid flowing between two chevrons in one line is turned by a chevron in a successive line.

6. A membrane as in claim 5, wherein each feature is 0.01" to 0.03" in thickness, 0.08" to 0.2" in width, 0.1" to 0.3" in height, disposed with a gap of 0.4" to 0.7" between adjacent features in each line and line spaced 0.4" to 0.7" apart.

7. A membrane as in claim 6, wherein each feature is 0.02" in thickness, 0.0938" in width, 0.1875" in height, disposed with a gap of 0.5625" between adjacent features in each line and line spaced 0.5625" apart.

8. A membrane as in claim 1, wherein the spacing features comprise a plurality of line segments, wherein a first subset of the line segments are oriented at a first angle to the direction from inlet to outlet, and wherein a second subset of the line segments are oriented at a second angle to the direction from inlet to outlet, and wherein the line segments are positioned such that fluid flow in a direction along a line segment in the first subset is redirected by a line segment in the second subset.

9. A membrane as in claim 8, wherein the features are 0.01" to 0.03" in thickness, with equal length and height of 0.1" to 0.3".

10. A membrane as in claim 9, wherein the first angle is 35° to 55° and the second angle is 125° to 145°.

11. A membrane as in claim 10, wherein the features are separated by 0.4" to 0.7".

12. A membrane as in claim 11, wherein the features are separated by 0.5625".

13. A membrane as in claim 9, wherein the first angle is 12.5° to 32.5° and the second angle is 147.5° to 167.5°.

14. A membrane as in claim 1, wherein the features are separated by 0.19" to 0.39".

15. A membrane as in claim 1, wherein the second height is no more than one half the first height.

16. A membrane as in claim 1, wherein the spacing features are no more than 0.01" in height.

17. A membrane as in claim 1, wherein the spacing features are made of one or more of thermoplastics, reactive polymers, waxes, or resins; deposited directly onto the membrane surface.

18. A membrane as in claim 1, wherein the spacing features are made of one or more of high-temperature thermoplastics, metals, or ceramics; formed apart from the membrane surface and then adhered to the membrane surface.

19. A permeable membrane system comprising a membrane as in claim 1.

20. A method of treating water, comprising providing a permeable membrane system as in claim 19, and passing water to be treated through the permeable membrane system.

* * * * *